United States Patent
Crocker et al.

[19]

[11] Patent Number: 5,915,265
[45] Date of Patent: Jun. 22, 1999

[54] METHOD AND APPARATUS FOR DYNAMICALLY ALLOCATING AND RESIZING THE DEDICATED MEMORY IN A SHARED MEMORY BUFFER ARCHITECTURE SYSTEM

[75] Inventors: Ken M. Crocker, Orangevale; Radhakrishnan Venkataraman, Folsom, both of Calif.; Nicholas Wade, Vancouver, Wash.

[73] Assignee: Intel Corporation, Santa Clara, Calif.

[21] Appl. No.: 08/577,490

[22] Filed: Dec. 22, 1995

[51] Int. Cl.⁶ .................................................. G06F 12/00
[52] U.S. Cl. ........................................... 711/170; 711/173
[58] Field of Search .................... 395/497.03, 497.01, 395/250; 711/170, 173

[56] References Cited

U.S. PATENT DOCUMENTS

| | | | |
|---|---|---|---|
| 4,654,787 | 3/1987 | Finnell et al. | 395/497.03 |
| 4,713,759 | 12/1987 | Yamagishi et al. | 395/405 |
| 4,980,850 | 12/1990 | Morgan | 395/497.03 |
| 5,097,414 | 3/1992 | Tone | 395/444 |
| 5,241,663 | 8/1993 | Rohwer | 395/497.03 |
| 5,339,400 | 8/1994 | Iijima | 395/442 |
| 5,448,710 | 9/1995 | Liu | 395/497.03 |
| 5,469,558 | 11/1995 | Lieberman et al. | 395/285 |
| 5,511,180 | 4/1996 | Schieve | 395/497.03 |
| 5,553,220 | 9/1996 | Keene | 395/154 |
| 5,584,015 | 12/1996 | Villette et al. | 395/463 |
| 5,687,392 | 11/1997 | Radko | 395/842 |

OTHER PUBLICATIONS

"INSIDE OS/2" By Geordon Letwin; pp. 245–247, 1988.
"i486 Processor Programmer's Reference Manual" by Intel p. 8–3, 1990.

*Primary Examiner*—Krisna Lim
*Attorney, Agent, or Firm*—Blakely, Sokoloff, Taylor & Zafman

[57] ABSTRACT

A method and system for dynamically sizing a dedicated memory in a shared memory buffer architecture. At initial boot, system BIOS programs control register to allocate a dedicated memory of a desired size. The size of the dedicated memory allocated is dependent on the performance requirements. If after initial boot, the performance requirements change, it may necessitate a change in dedicated memory size. By reprogramming the control registers, the dedicated memory size is dynamically changed without any manual manipulation of internal components.

7 Claims, 6 Drawing Sheets

METHOD AND APPARATUS FOR DYNAMICALLY ALLOCATING AND RESIZING THE DEDICATED MEMORY IN A SHARED MEMORY BUFFER ARCHITECTURE SYSTEM

BACKGROUND OF THE INVENTION (1) Field of the Invention

The invention relates to a system in which one or more devices share physical memory with the operating system. More specifically, the invention relates to dynamically sizing the amount of memory dedicated to a device other than the operating system.

(2) Related Art

Computer support for graphics over the years have varied substantially. The bulk of graphic support has been external to the host processor and its memory, usually taking the form of a graphics controller either on an I/O card inserted into a slot in an I/O bus or soldered on the motherboard, but still electrically connected to the I/O bus. The graphics controller subsystem typically also includes a frame buffer which may be made from a block of any standard memory type, e.g., DRAM, VRAM, SRAM, etc., which is used to hold images to be output to a display device. The host processor then had unlimited use through a memory controller of physical memory associated with the system. Such physical memory is usually composed of dynamic random access memory (DRAM). Current frame buffers are typically in the range of half a megabyte to four megabytes in length. The memory used in the dedicated frame buffer increases the cost of the system proportional to frame buffer size. Significantly, changing the size of the frame buffer requires physically opening the box and installing additional memory units. Thus, resolution and number of colors of graphics is limited by the size of the installed frame buffer.

FIG. 1 shows a typical prior art system. CPU 1 is connected to a bridge 3 by CPU bus 2. The chipset 3 contains a memory controller, a bridge, and an arbitration unit which determines whether addresses received should be forwarded to system memory 4 via the memory controller or down to an I/O bus 8 via the bridge. I/O buses have a number of slots, and the I/O address space is allocated to various slots. In this case, graphics controller 5 occupies one slot on I/O bus 8. The remaining slots on I/O bus 8 are not shown. When the chipset 3 forwards an address to I/O bus 8 which graphics controller 5 recognizes as one of the addresses assigned to it, graphics controller 5 claims a transaction and begins processing. The transaction may cause the graphics controller 5 to fill the frame buffer 6 with data to be displayed on display 7. The graphics controller 5 and frame buffer 6 may be on a single add-in card, or one or both may be attached directly to a motherboard. Alternatively, if the CPU sends the chip set an address recognized to be within system memory 4, the memory controller in the chipset 3 accesses the system memory directly. A system shown in FIG. I is well known in the art and is appropriately handled by all standard operating systems.

Every system has an operating system which is responsible for controlling the allocation and usage of hardware resources such as memory, central processing unit time, disk space, and peripheral devices. Among the popular operating systems are MS-DOS, UNIX, OS/2, Windows, and many others. At initial start-up, the basic input/output system (BIOS) initializes the system and configures it for the desired mode of operation. The BIOS then passes control to the operating system. Once the O/S has control, it can ask for parameters from BIOS regarding system configuration including memory available and other features important to the operating system's allocation and control functions. While some operating systems accept the parameters passed by BIOS as given, other operating systems check at least some of the parameters on their own to insure that they have the correct values. Memory size is a parameter which is commonly checked by some currently existing operating systems. An operating system checks the memory size by writing to the memory at some increment, usually one megabyte, and then reading back the previously written address. Once an address is written and the read returns no value, the operating system presumes it has reached the top of the memory. This process is known as memory sizing.

There is at least one vestige of prior art systems that require special accommodations today. Early PC architecture designated addresses directed to the address range A000–C000 to be graphical transactions. Thus, such addressed transactions were forwarded to the I/O bus for graphical processing by the graphics controller. Physical memory has since enveloped this address range, but for compatibility reasons, it is treated as a hole in system memory with all accesses to this range being forwarded to the I/O bus.

Some prior art work stations have successfully eliminated the additional cost of a stand alone frame buffer memory unit by employing a portion of the physical system memory as the frame buffer. Unfortunately, these prior art systems were not designed to allow the use of arbitrary operating systems. These systems require that the operating system know that a portion of the physical memory had been allocated to the frame buffer so that it would not try to access that portion of physical memory or allocate it to another function. Thus, such allocation of physical memory to a frame buffer is impractical in an environment such as the personal computer where arbitrary operating systems are likely to be employed. Moreover, these systems fail to cure the disadvantage of having a fixed size frame buffer since changes in size necessitate changes in the operating system. Moreover, since the size is fixed, the resolution of the graphical output is limited and in the event that a large fixed size frame buffer is provided, inefficient use of memory results any time the resolution of the graphics used does not employ the entire frame buffer.

Therefore, it would be desirable to be able to dynamically allocate physical memory to a device other than the operating system while maintaining the flexibility of the system to execute any arbitrary operating systems supported. Moreover, it would be desirable to provide graphical support on the motherboard without requiring the expense of a corresponding add-in dedicated memory.

BRIEF SUMMARY OF THE INVENTION

A method and system for dynamically sizing a portion of physical memory dedicated to a device in a shared memory buffer architecture is disclosed. At initial boot, the system BIOS programs control registers to allocate a device dedicated portion of physical memory of a desired size. The size of the portion is determined by desire operation or needs of the device. If the device need or desired operation changes, control registers are reprogrammed to change the amount of memory dedicated to the particular device.

In one embodiment, the device is a graphics controller, and the portion allocated is a frame buffer. The size of frame buffer allocated is dependent on the resolution and number of colors desired. If after initial boot the desired resolution or number of colors changes, it may necessitate a change in frame buffer size. In a shared memory buffer system, it is desirable to allocate the smallest supported frame buffer which will fulfill the resolution and color requirements. This leaves more physical memory available to the operating system.

If a size change is needed to a larger size of frame buffer, physical memory must be reclaimed from the operating system. The memory can be reclaimed by changing the value in the control register to indicate the desired size at boot time. Thus, by changing the values in the control registers and rebooting the system, a frame buffer of the new size is created. If a size change to a smaller frame buffer is possible, the system can do any of the following: i) use the larger frame buffer; ii) restrict the frame buffer size leaving a portion of memory unused; or iii) reboot to allocate the smaller frame buffer and reclaim the extra memory back to the system. The course of action is dictated by the performance effect of keeping or releasing the excess memory. Significantly, this resizing is transparent to the operating system and does not require opening the chassis to insert different memory chips as in prior art systems.

DETAILED DESCRIPTION OF THE INVENTION

The invention provides a method and apparatus for creating a dynamically sizable dedicated memory space in a shared memory buffer architecture (SMBA) system. A SMBA system is one in which physical memory is shared between dedicated memory allocated for use by one or more device and system memory available to the operating system. For the purposes of explanation, specific details are set forth to provide a thorough understanding of the present invention. However, it will be understood by one skilled in the art that the invention may be practiced without these details. Notably, throughout the following description, the dedicated memory space is presumed to be a frame buffer dedicated to the graphics controller, dedication of a portion of physical memory to other devices and for other purposes is within the scope and contemplation of the invention.

Figure 1:
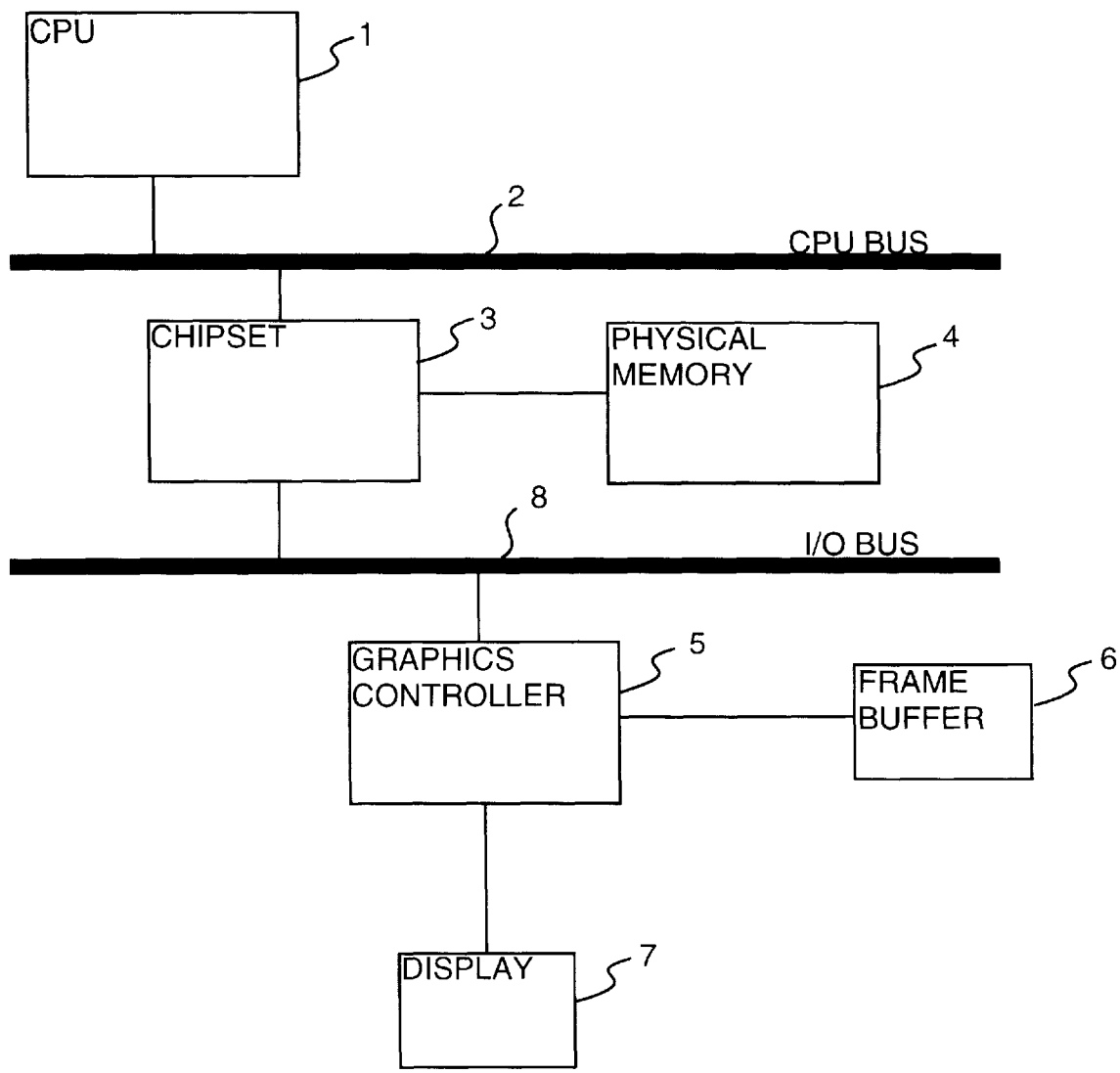
FIG. 1 shows a block diagram of a prior art system in which a graphics controller is provided a discrete frame buffer.
Figure 2:
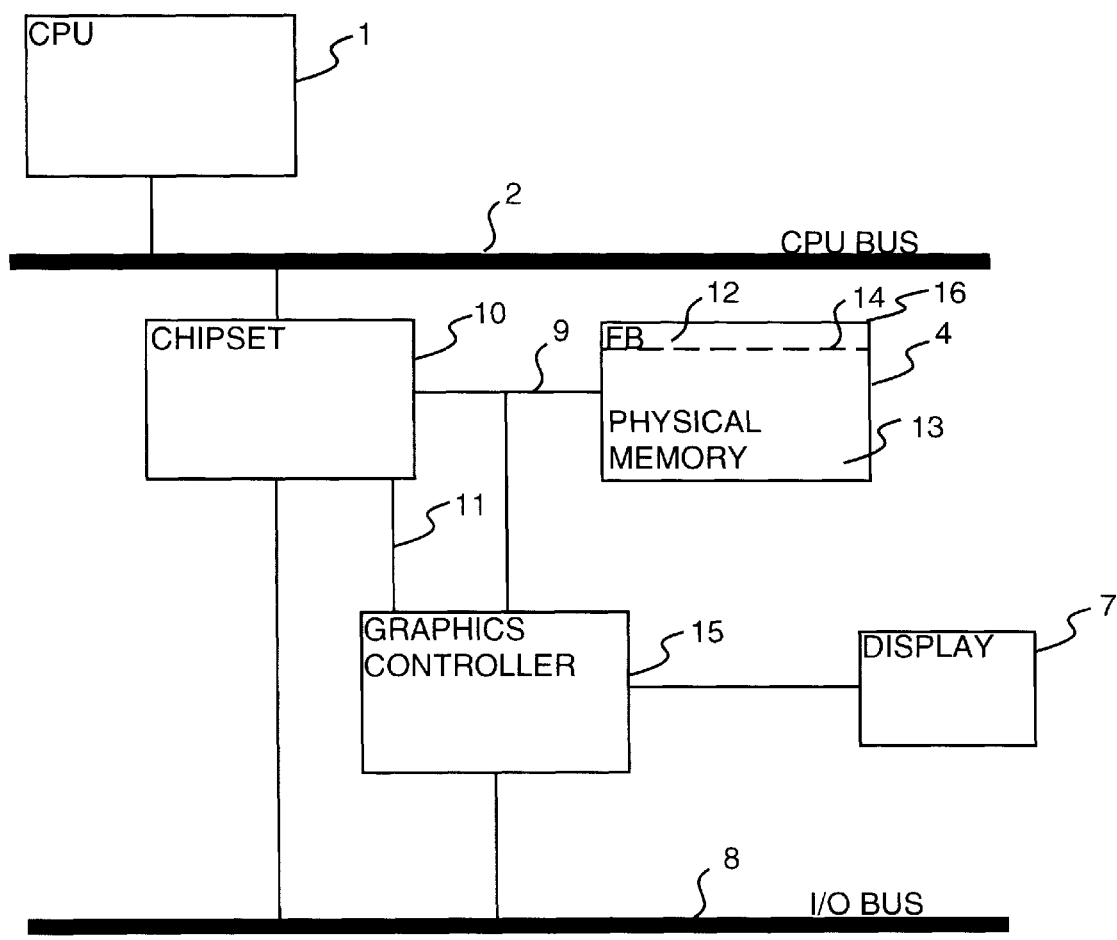
FIG. 2 shows a block diagram of a shared memory buffer architecture system of the invention.

FIG. 2 shows a CPU 1 connected by a CPU bus 2 to a chipset 10. Chipset 10 is coupled to I/O bus 8. Chipset 10 is also coupled to the physical memory 4 by memory bus 9. Graphics controller 5 is coupled to I/O bus 8 and shares memory bus 9 with bridge 10. Arbitration lines 11 connect the chipset and graphics controller that are used to arbitrate for memory bus 9. Graphics controller 5 is also connected to display 7. Physical memory 4 comprises a system memory 13 and frame buffer 12. Frame buffer 12 is the memory space between top of system memory 14 and top of physical memory 16. The row base address for frame buffer 12 begins at the first address above top of system memory. While in the shown embodiment, the graphics controller 5 is shown coupled to the memory bus 9 and having dedicated arbitration lines 11 for arbitrating access to the memory bus 9, other possible embodiments exist.

In an alternative exemplary embodiment, the graphics controller 5 would not share the memory bus with the chipset. In such an embodiment, the graphics controller 5 residing on an I/O bus may forward transactions back through the chipset rather than accessing the memory directly. This would eliminate the need for the arbitration line of the previously described embodiment.

Physical memory 4 can be composed of any standard memory units. Because physical memory is usually implemented in dynamic random access memory (DRAM), an exemplary embodiment of the invention envisions using DRAM for physical memory 4. There are numerous varieties of DRAM including EDO and SDRAM. Any such variant could be used in the instant invention. The I/O bus 8 is preferably a PCI bus, but may alternatively be some other I/O bus. CPU 1 may be any of the myriad of processing units available. Chipset 10 must perform bridge functions between the CPU bus 2 and the 110 bus 8.

Figure 3:
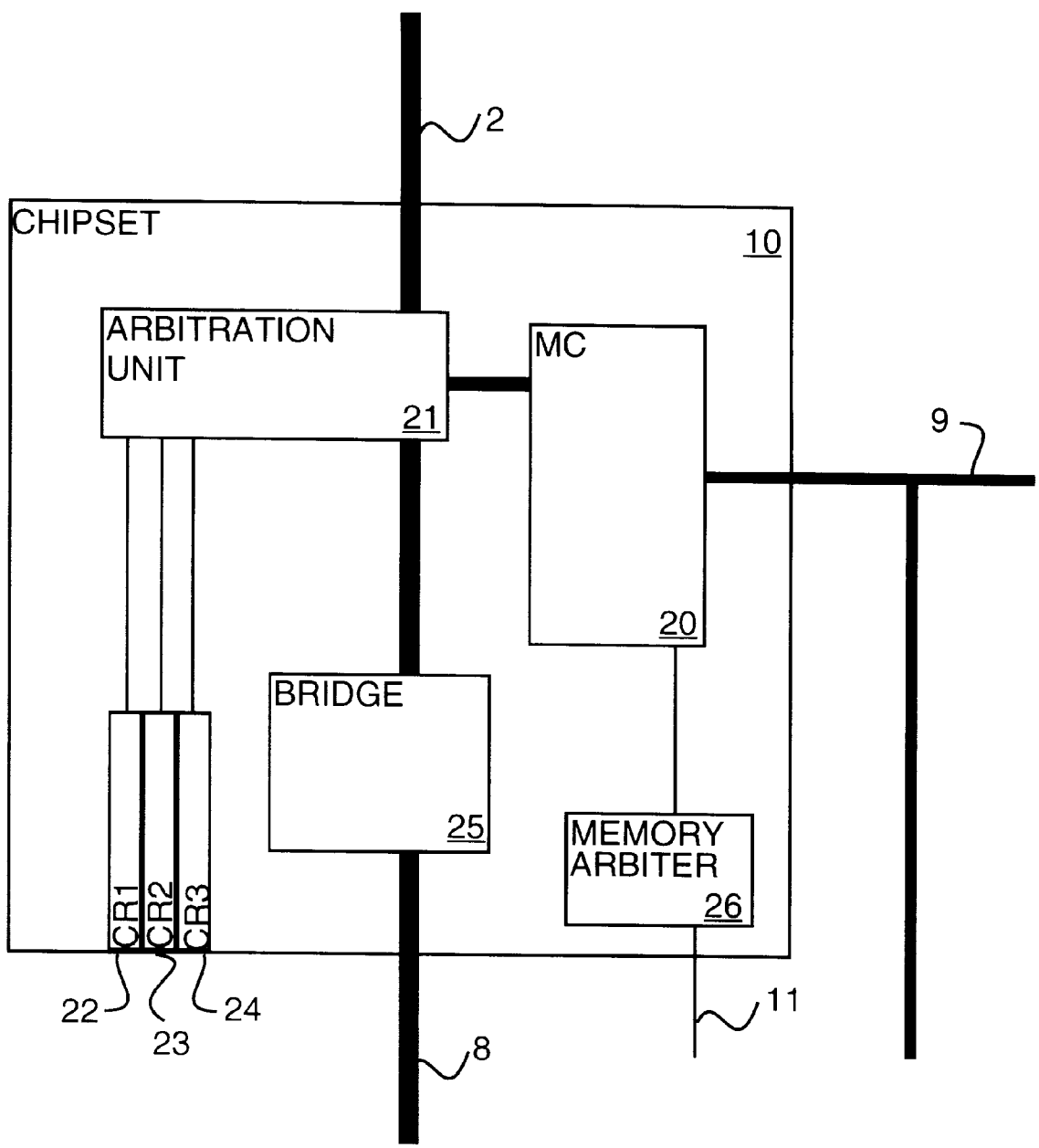
FIG. 3 shows a block diagram of the chipset of FIG. 2.

FIG. 3 shows one exemplary embodiment of the chipset 10 for use in the invention. It will be recognized by one of ordinary skill in the art that the individual components of chipset 10 could be constituted discretely. In this exemplary embodiment, these components are, however, grouped as a unit. Arbitration unit 21 receives addresses from the CPU bus 2 and arbitrates whether the address should be sent to memory and cache controller 20 or to the bridge 25 to be forwarded to the I/O bus 8. The memory and cache controller 20 provides an interface between the CPU 1 and the physical memory 4. Memory arbiter 26 arbitrates between the memory controller 20 and the graphics controller 15 for access to the memory bus 9. Memory arbiter 26 can be discrete or combined with arbitration unit 21. In an alternative embodiment, memory arbiter may be omitted entirely and the graphics controller 15 may forward its frame buffer accesses back through bridge 25 to be handled by memory controller 20.

A plurality of programmable bits shown in FIG. 3 as control register 22, control register 23, and control register 24 store a control information which affects arbitration and the claiming of addresses by the memory controller 20. Control register 22 is programmed to indicate whether a graphics add-in card is present on the I/O bus. If an add-in card is present on the 110 bus, it will be necessary to disable graphics controller 15 and the allocation of frame buffer 12 in favor of the add-in card. In one embodiment, allocating an aperture size of zero will create no frame buffer in the physical memory. With no allocated frame buffer, the graphics controller will not claim addresses sent to the I/O bus. Control register 23 holds a value indicating the row base address for frame buffer 12 in physical memory 13.

In one embodiment, control register 23 could hold the actual row base address while in another embodiment, it may simply hold a coding from which the row base address may be derived. For example, in an embodiment in which only frame buffers of 1M and 2M are supported, a single bit in conjunction with the memory size (which need not be stored in the control register) would be sufficient to generate a row base address. One of ordinary skill in the art will readily recognize how this example can be expanded. By changing the row base address in control register 23, the amount of physical memory allocated to the frame buffer can be dynamically changed on each boot. Control register 24 indicates whether the aperture to the frame buffer is open or closed. The aperture should be closed at initial boot. If the aperture is open, the memory controller 20 will claim addresses corresponding to the physical location of the frame buffer 12 and read or write the data in such locations directly. Conversely, if the aperture is closed, the memory controller 20 will not claim physical addresses residing in the frame buffer 12, and such addresses will be forwarded down to the I/O bus. Significantly, no I/O device is mapped to such physical frame buffer locations and, therefore, when the aperture is closed, such address references will go unclaimed, since the graphics controller has not been initialized to recognize such references. This process is described more fully below.

Figure 4:
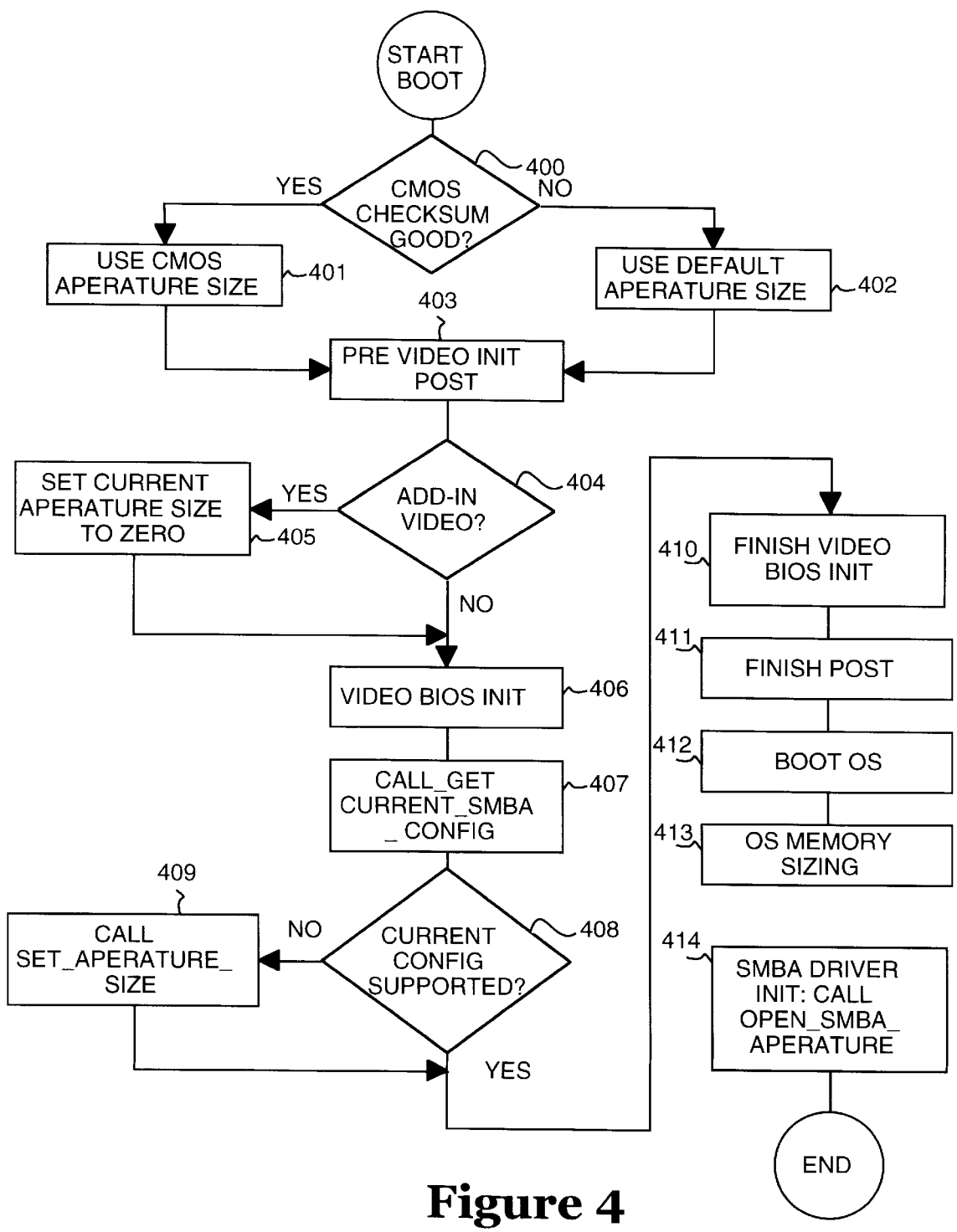
FIG. 4 shows a flowchart of the boot sequence of the system of FIG. 2.

FIG. 4 is a flowchart of the boot sequence of a system employing one embodiment of the instant invention. At start-up, the system BIOS begins configuring the system for operation. At decision box 400, a determination is made whether the CMOS checksum is good. As long as the CMOS checksum is good, e.g., there has been no battery failure to the battery backed-up CMOS memory holding the configuration information, functional block 401 will be executed and previously programmed values will be employed in setting the aperture size of the frame buffer. If the checksum is not good, BIOS will provide a default aperture size at functional block 402. Functional block 403 corresponds to the BIOS determination of memory size and type, and the setting of control register 23 of FIG. 3 to indicate the row base address of the frame buffer. At functional block 403, existing I/O devices claim device node space which coordinates subsequent resource allocation and other standard system initialization. A check is then made at decision block 404 for the existence of a graphics add-in card. If such add-in card exists, the aperture size is set to zero by changing the base row address to equal the top of physical memory at functional block 405.

Once no add-in card is found or after the aperture is set to zero, the video BIOS initialization begins at functional block 406. The video BIOS is provided as part of the graphics controller, and is provided with the ability to call system BIOS routines. Such a call of Get_Current_SMBA_Configuration at functional block 402 is used to check the control registers and returns the current frame buffer settings. Decision block 408 corresponds to a determination of whether the configuration as set is supported by the graphics controller and if adequate video space has been allotted. If the current configuration is not supported, a second system BIOS routine Set_Aperture_Size is called at functional block 409 to set the aperture to one supported by the graphics controller. This routine updates the frame buffer aperture size in the CMOS memory and in the control registers of the bridge. The video BIOS initialization ends at functional block 410 after either the video BIOS through the call at functional block 409 sets an acceptable aperture size or the current configuration is supported at decision block 408. At functional block 411, a test of system memory is conducted and other standard system initialization.

At functional block 412, the operating system is booted if the O/S is one which accepts the memory parameters from the BIOS. Nothing further need be done. However, for those operating systems which perform memory sizing, memory sizing is performed at functional block 413. However, because control register 24 of the bridge is configured to have the aperture closed, when the O/S writes to an address within the allocated frame buffer, the write will go to the chipset, the memory controller will not claim it and, accordingly, it will be forwarded down to the I/O bus. Because as mentioned above, no device on the I/O bus, including the graphics controller, is mapped to a frame buffer physical addresses, no device on the I/O bus claims the write. Similarly, when the operating system asserts a read back of this write, the memory controller does not claim it, and no device on the I/O bus claims it, so no data is returned. Thus, the operating system is caused to believe that it has reached the top of memory at the previous write.

Functional block 414 is only executed if the graphics device driver is aware of the SMBA system, in which case the device driver can reset control register 24 to allow the memory controller to claim accesses to the physical addresses within the frame buffer. Where the memory controller is allowed to directly access the frame buffer's physical location, the processor must still be prevented from caching the frame buffer. It can be seen that the simple architecture is backward compatible and allows booting of arbitrary operating systems in a transparent manner such that the operating system is wholly unaware that it is sharing any portion of the physical memory with the graphics controller or other device to which a portion of physical memory may be dedicated.

In one exemplary embodiment of the invention, four avenues of access to the frame buffer are supported. The first avenue of access is provided by using a virtual frame buffer space which is remapped to the physical address space of the frame buffer. Transactions to this virtual address space (e.g., PCI space above 26) will then be forwarded to the I/O bus and claimed by the graphics controller. The graphics controller will then arbitrate with the memory controller for access to the memory bus so the graphics controller can access to the physical frame buffer at the corresponding location. The second avenue of access is through the A000 to C000 window. A000 to C000 corresponds to the graphics location of early generations of PC architectures. Thus, for full backward compatibility, references to these addresses must be recognized as frame buffer accesses. Accordingly, such references will also be forwarded down to the I/O bus and claimed by the graphics controller. The third avenue of access as mentioned above is direct access by the memory controller. This third avenue is only available when the graphics device driver knows the SMBA system and therefore opens the aperture by changing the appropriate control register in the bridge. Once the aperture is opened, the physical memory references to the frame buffer can be claimed by the memory controller, and manipulation of the frame buffer can be performed directly by the memory controller. There may be cases where such direct access provides significant performance advantages over forwarding the references to the I/O bus to be claimed by the graphics controller. Conversely, it is easy to conjecture situations in which it would be undesirable to directly access the frame buffer because a previous transaction may not yet have completed by the less direct I/O route. Finally, the fourth avenue of access is when the aperture is closed, the graphics controller can be initialized to claim address in the physical memory corresponding to the frame buffer.

Figure 5:
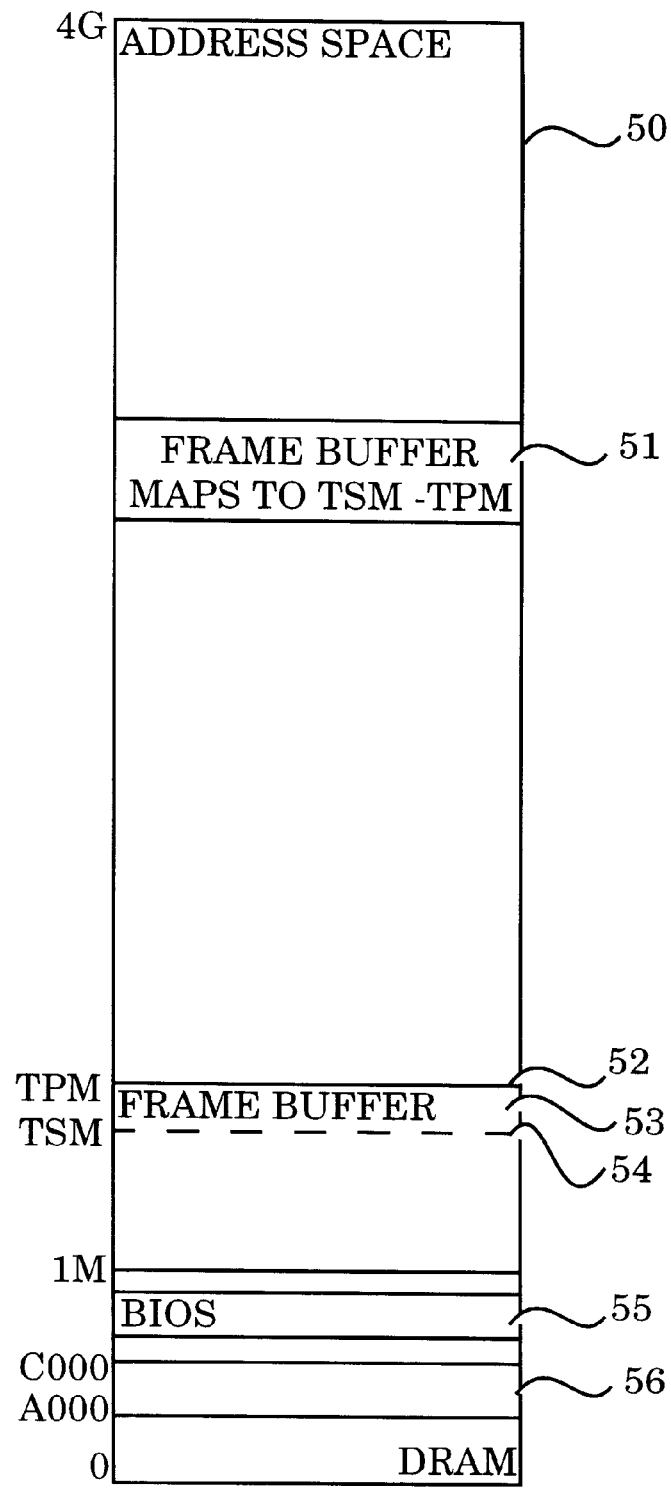
FIG. 5 shows a memory map of the system of FIG. 2.

FIG. 5 shows an example address space 50 of one embodiment of the invention. The virtually mapped frame buffer 51 can be accessed by the graphics controller and maps to the physical frame buffer 52 as shown. Address space A000 to C000 is effectively a hole in physical memory and remains unused because all references to this space are forwarded to the I/O bus and mapped by the graphics controller to the physical frame buffer 52. Frame buffer 52 is constrained on the upper end by top of physical memory (TPM) 53 and on the lower end by top of system memory (TSM) 54. By appropriately setting the programmable bits in the chipset, the size of the frame buffer can be varied. Significantly, it is desirable to configure the frame buffer to occupy as little physical memory space as possible and still support the desired resolution of the systems graphics. The smaller the frame buffer, the larger the systems memory which will allow for improved performance of the operating system.

In one exemplary embodiment, frame buffer sizes in half meg increments are supported from half a meg to four meg. In a system with 16 megabytes of physical DRAM, this corresponds to system memory sizes of 15.5 to 12 megabytes, respectively. While this exemplary embodiment only accommodates frame buffer sizes up to 4 meg, it is envisioned that frame buffers could be arbitrarily large limited only by physical memory and the memory required for the operating system to function. Moreover, while in the example, top of physical memory 53 would be at 16 megabytes, and top of system memory between 12 and 15.5 megabytes, systems with more or less physical memory may still employ the invention. For example, top of physical memory 53 may be at 8 megabytes in one system or moving in the opposite direction, 32 megabytes in another. As the physical memory shrinks, it may be necessary to restrict the frame buffer sizes supported to insure adequate system memory for the operating system. All such iterations are within the scope and contemplation of the instant invention.

Figure 6:
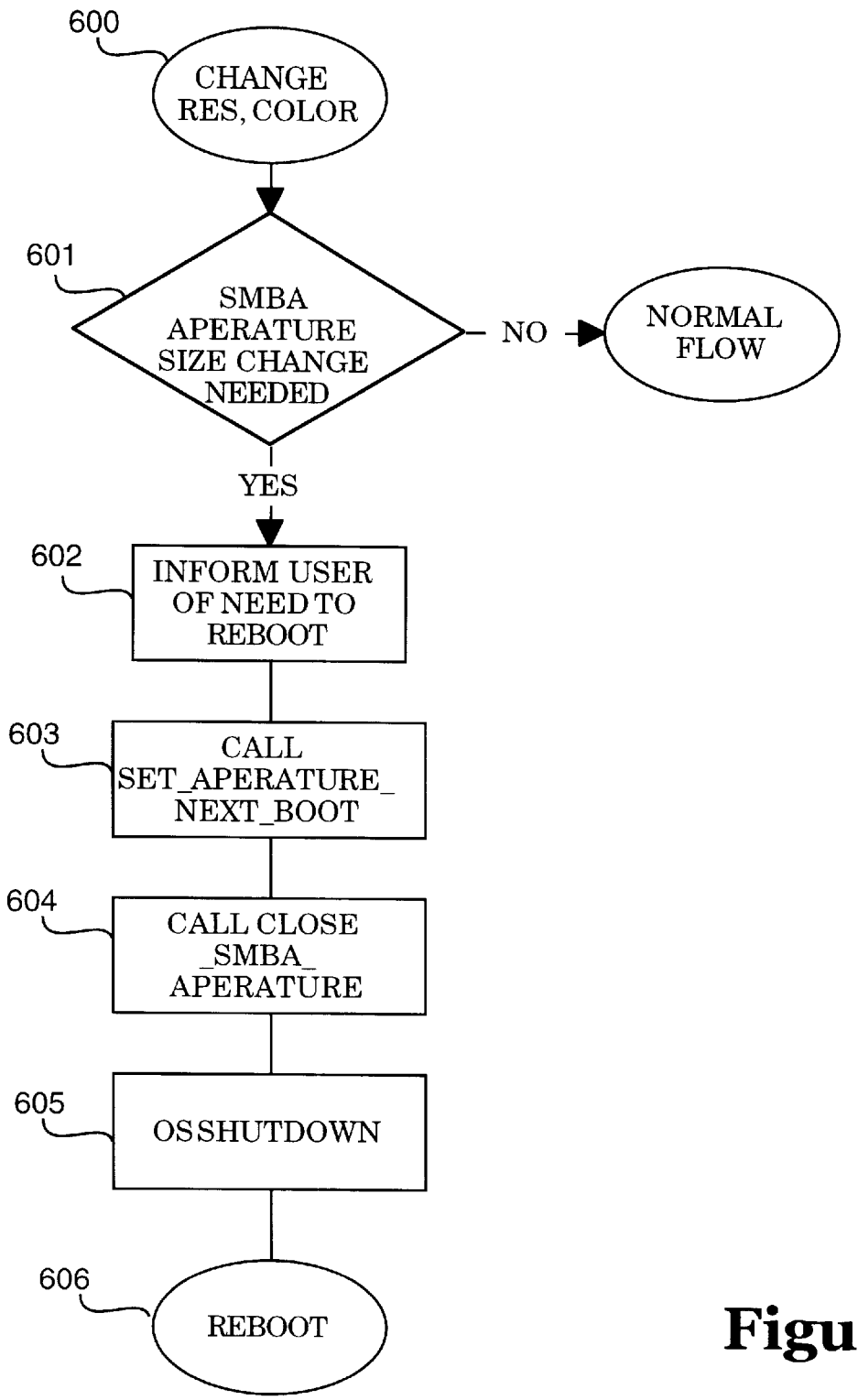
FIG. 6 shows a flowchart of resizing the frame buffer in the system of FIG. 2.

FIG. 6 is a flowchart of dynamically resizing a frame buffer aperture in one embodiment of the invention. The dynamic resizing algorithm is entered in response to a change in resolution or number of color combinations requested by a user, an application, or some other source at block 600. Based on the requested change for resolution or color, a decision is made at decision block 601 whether the SMBA aperture size should be changed. If not, the system proceeds with normal flow. As a general matter, it is not necessary to change the aperture size if the number of colors or resolution are reduced. However, if the reduction would free up a significant portion of physical memory for operating system use, performance considerations may warrant changing the aperture size even in response to reduction in resolution or number of colors used.. The primary reason an aperture size may need to be changed is that the requested resolution or color combinations require a frame buffer size larger than that allocated. In this case, the user is informed of the need to reboot at functional block 602. At functional block 603, a call is made to the system BIOS routine Set_Aperture_Size_Next_Boot and the desired values are loaded into the battery backed up CMOS from which initialization parameters are derived when the checksum is valid. The appropriate bit in the bridge is set to close the SMBA aperture by calling the BIOS routine Close_SMBA_Aperture at functional block 604. Once the aperture is closed and the desired parameters for the next boot are configured, the O/S is shut down at functional block 605, and reboot occurs at block 606. This reboot is shown in FIG. 4.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising the steps of:

allocating a first portion of a physical memory to be a dedicated memory including programming at least a first programmable bit to indicate a dedicated memory base address; and programming at least a second programmable bit to indicate a dedicated memory size, the dedicated memory usable by a first device;

allocating a second portion of the physical memory to be a system memory, the system memory usable by an operating system executing on a host processor; and dynamically changing the amount of physical memory allocated to the dedicated memory responsive to a predetermined condition.

2. The method of claim 2 wherein the step of changing comprises the step of:

determining if the predetermined condition exists; and reprogramming the at least a first and the at least a second programmable bits with a value corresponding to a new dedicated memory base address and size.

3. The method of claim 2 wherein the step of reprogramming comprises the steps of:

calling a system BIOS routine to load desired values into at least one of the first and second programmable bits and a location in a CMOS memory; and calling a second system BIOS routine to close an aperture of the dedicated memory.

4. The method of claim 2 further comprising the steps of:

informing a user of a need to reboot;

shutting down an operating system; and rebooting the operating system.

5. A method comprising the steps of:

allocating a first portion of a physical memory to be a dedicated memory, the dedicated memory usable by a first device;

allocating a second portion of the physical memory to be a system memory, the system memory usable by an operating system executing on a host processor; and dynamically changing the amount of physical memory allocated to the dedicated memory responsive to a predetermined condition.

6. The method of claim 5 wherein the device is a graphics controller, and the dedicated memory is a frame buffer.

7. A method comprising the steps of:

allocating a first portion of a physical memory to be a dedicated memory, the dedicated memory usable by a first device;

allocating a second portion of the physical memory to be a system memory, the system memory usable by an operating system executing on a host processor; and dynamically changing the amount of physical memory allocated to the dedicated memory responsive to a predetermined condition, wherein the predetermined condition exists if a resolution or a number of colors to be used requires a larger frame buffer than the first portion of physical memory.

\* \* \* \* \*

UNITED STATES PATENT AND TRADEMARK OFFICE
CERTIFICATE OF CORRECTION

PATENT NO. : 5,915,265
DATED : June 22, 1999
INVENTOR(S) : Crocker et al.

It is certified that error appears in the above-identified patent and that said Letters Patent is hereby corrected as shown below:

Column 4,
Line 22, delete "110" and insert -- I/O --.
Line 47, delete "110" and insert -- I/O --.

Column 8,
Line 18, after "claim" delete "2" and insert -- 1 --.

Signed and Sealed this

Twenty-eighth Day of August, 2001

*Attest:*

NICHOLAS P. GODICI
*Attesting Officer*  Acting Director of the United States Patent and Trademark Office